INVENTORS
DAVID T. N. WILLIAMSON
DONALD F. WALKER

BY
Cameron, Kerkam & Sutton
ATTORNEY

INVENTORS
DAVID T. N. WILLIAMSON
DONALD F. WALKER
BY Cameron, Kerkam & Sutton
ATTORNEYS United States Patent Office 3,124,755
Patented Mar. 10, 1964

3,124,755

APPARATUS FOR CONVERTING ELECTRICAL SIGNALS FROM PHASE-MODULATED SINUSOIDAL FORM TO PULSE FORM

David Theodore Nelson Williamson, Priorwood, Polton, Midlothian, and Donald Ferguson Walker, Barnton, Midlothian, Scotland, assignors to Ferranti, Limited, Hollinwood, Lancashire, England, a company of Great Britain and Northern Ireland Filed Dec. 28, 1959, Ser. No. 862,241
Claims priority, application Great Britain Nov. 27, 1956
5 Claims. (Cl. 328—134)

This invention relates to signal-translating apparatus for receiving information in the form of a sinusoidal signal phase-modulated with respect to a reference sinusoidal signal and converting that information to the form of a train of electrical pulses some of positive and some of negative sense and each representing a fixed unit of information.

This application is a continuation-in-part of co-pending application Serial No. 699,294, filed November 27, 1957, now abandoned.

The invention has particular but not exclusive application to machine-tool control where each pulse represents a discrete movement of predetermined extent in one or other direction along a given axis of a machine tool or workpiece to be controlled.

Certain forms of computers used for machine-tool control supply an output in the form of a sinusoidal signal which is phase-modulated with respect to a reference sinusoidal signal, whereas certain forms of machine tools require the recorded information to be in the form of pulses of the kind described above. In this case it may be necessary to convert the information from phase-modulated form to pulse form. An object of the invention is accordingly to provide apparatus for effecting such a conversion, for machine-tool control or for other purposes.

Figure 1:
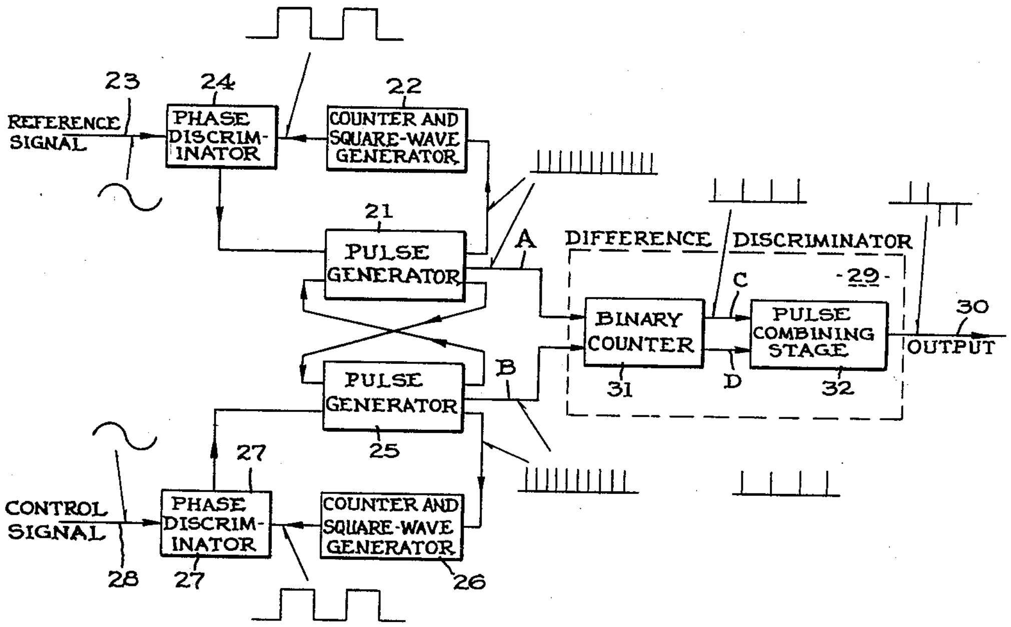
Figure 2:
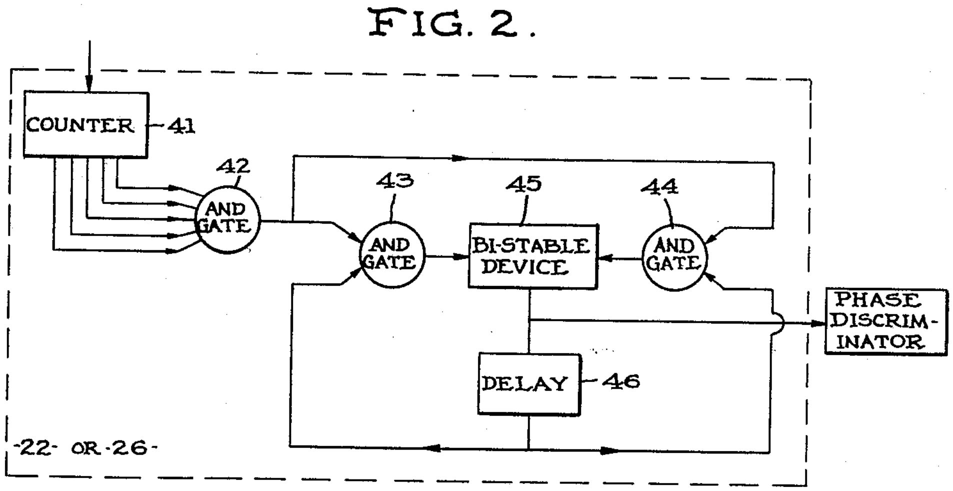
Figure 3:
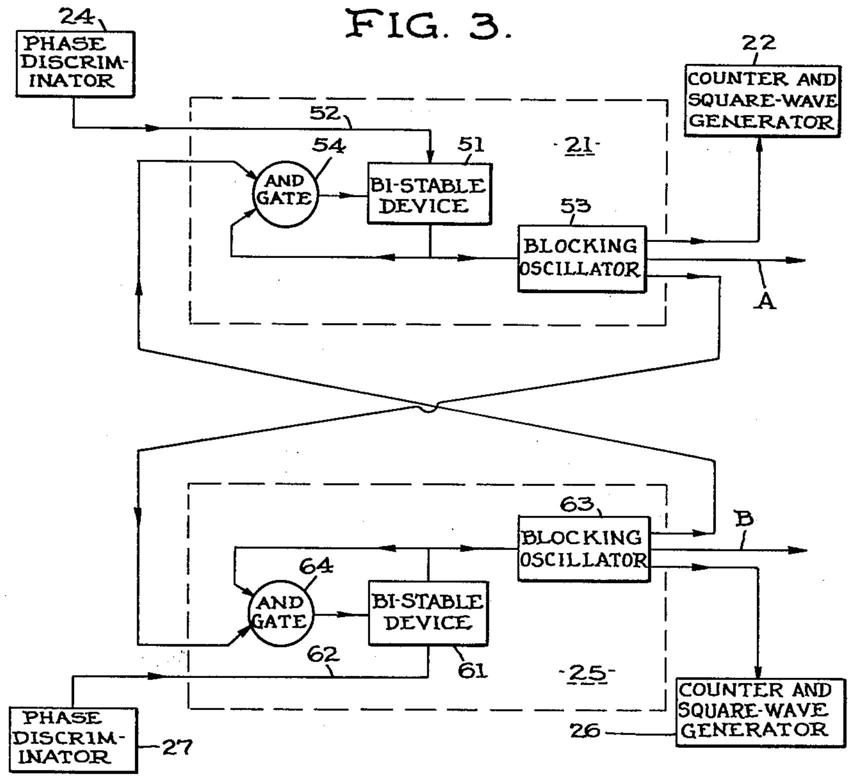
Figure 4:
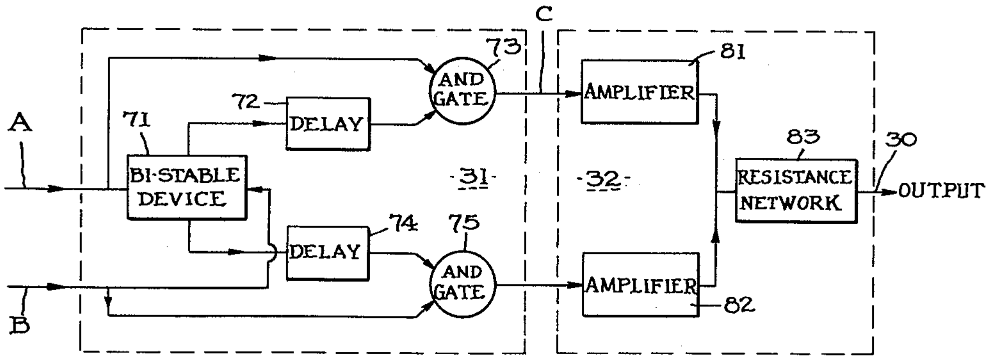

In the accompanying drawings,

FIGURE 1 is a schematic diagram of an embodiment of the invention, with the voltage waveforms at various points in the circuit approximately indicated, and FIGURES 2 to 4 are diagrams in greater detail of some of the components shown generally in FIGURE 1.

The invention will now be described by way of example as applied to a machine-tool control system. The control information is provided in the form of a sinusoidal signal which is phase-modulated with respect to a reference sinusoidal signal of constant frequency F cycles per second. On the other hand the machine itself requires for its control a train of pulses some of positive sense and some of negative sense and each representing a discrete movement of the tool in one or other direction, as the case may be.

Signal-translating apparatus in accordance with the invention includes a first generator 21 (see FIG. 1) of pulses of constant sense but controllable repetition frequency. Generator 21 feeds pulses to a combined counter and squarewave-generator 22 designed to count the pulses received and switch its output voltage sequentially between limits +V to −V after every $N/2$ pulses, where N is the number of pulses which is to correspond to a phase shift of 360 degrees of the incoming sinusoidal signal to be converted. Various known combinations of counter and bi-stable circuit may be used for this purpose; a suitable one will be described later. Generator 22 thus produces a signal of symmetrical rectangular waveform such that the number of generator pulses which are received during each half-cycle of the signal has the constant value $N/2$.

This rectangular signal is compared with the reference sinusoidal signal, delivered over an input channel 23, in a phase discriminator 24 the output from which is applied to control the pulse repetition frequency of generator 21 to maintain rectangular and reference signals in phase or in other fixed phase relationship. The number of pulses generated during each half-cycle of the reference signal has thus the constant value $N/2$.

Similar equipment—a second pulse generator 25 of controllable repetition frequency, together with a counter and a squarewave-generator 26, and a phase discriminator 27, to which is also applied the control signal over a channel 28—is provided for the control signal. The number of pulses generated by this equipment during each half-cycle of the control signal has thus the same constant value $N/2$.

The pulse outputs from the two generators 21 and 25 are applied over channels A and B respectively to a difference discriminator 29 in which is derived a pulse train having a repetition frequency equal to the difference between the repetition frequencies of the pulse trains from generators 21 and 25, the pulses being of sense dependent on which of the generator frequencies is the greater, thereby producing over an output channel 30, usually as a record on a tape, the output train of pulses some of positive sense and some negative sense for controlling the machine.

Generators 21 and 25 include blocking oscillators arranged so that the pulses they deliver to discriminator 29 over channels A and B do not coincide in time; this is effected by interconnecting the oscillators in the manner to be described so that whichever is triggered first to produce a pulse inhibits—that is, prevents—the action of the other oscillator until that pulse is completed.

Included in discriminator 29 is a stage 31 which receives as input the pulses from the oscillators over channels A and B and delivers output pulses over channels C and D. The stage is arranged not to deliver any output pulse so long as the input pulses are delivered to it over channels A and B alternately, but to deliver an output pulse over channel C for each occasion when two consecutive input pulses are delivered to it over channel A, and to deliver an output pulse over channel D for each occasion when two consecutive pulses are delivered to it over channel B. For convenience, the stage 31 has been designated as a "Pulse Sequence Discriminator" in FIG. 1 and will be so referred to hereinafter.

In a further stage 32 the pulses received over channels C and D are combined in opposite senses and delivered over output channel 30, which, as already explained, may be in the form of a tape recording.

In operation, where the reference and control sinusoidal signals are in phase (or in the other fixed phase relationship)—representing the requirement that no movement of the tool is needed—the pulse trains developed by oscillators 21 and 25 have the same pulse repetition frequency. The input pulses to pulse sequence discriminator 31 are therefore delivered over channels A and B alternately, with the result that no pulses are delivered over lead C or lead D and none are recorded.

Suppose now that the phase of the control sinusoidal signal becomes displaced with respect to the reference signal, thereby representing a required movement of the tool. Pulses are now generated by one oscillator—oscillator 21, say (this is decided by the direction of the phase displacement)—at a faster rate than by the other oscillator. The pulses arriving over channel A have thus a higher repetition frequency than those arriving over channel B. At regular intervals, therefore, two pulses in succession will arrive over channel A and each time this occurs the pulse sequence discriminator 31 delivers an output pulse over channel C to the tape recorder. It will be appreciated that as stated above the repetition frequency of these output pulses is equal to the difference between the repetition frequencies of the pulses from oscillators 21 and 25.

Similarly when the phase displacement is in the other direction, the pulse train having the higher repetition frequency is now that delivered to discriminator 29 over channel B. Pulse sequence discriminator 31 now delivers its output pulses over channel D, at the repetition frequency above referred to.

Details of the components referred to generally above will now be described with reference to FIGURES 2 to 4, in which the components previously mentioned are given the same reference numbers as before.

The combined pulse-counter and square-wave generator 22 or 26 may be as shown in FIGURE 2.

The counter itself, which may be of the dekatron type, is shown at 41. From it connections are taken to an $N/2$ entry AND gate 42 so that the gate passes a pulse only when the count has the predetermined value $N/2$. The output from this gate is applied as one of the two inputs to each of two further AND gates 43 and 44 the outputs from which are respectively applied to the Set and Reset inputs of a device 45 have those two stable states. The output from this device after delay at a delay stage 46 is applied to the other inputs of gates 43 and 44. Gates 43 and 44 are respectively designed to pass a pulse from gate 42 whenever the condition of the delayed output from device 45 is that corresponding to the Reset or to the Set state of the device, as the case may be, thereby ensuring that the consecutive outputs from gate 42 alternately trigger the device from one stable state to the other. This produces a rectangular waveform at the output, which is applied to discriminator 24 or 27, as the case may be, to produce the required sinusoidal waveform each half-cycle of which is generated by $N/2$ pulses.

The interconnected generators 21 and 25 may be as shown in FIGURE 3.

Generator 21 includes a two-transistor multivibrator 51 the frequency of which is controlled in known manner by the D.-C. output from phase discriminator 24 applied over a lead 52. The signal of symmetrical rectangular waveform thereby generated (which will be referred to for convenience as signal 51) is applied to a blocking oscillator 53 so as to trigger it by each like edge of signal 51—say each negative-going edge. As the result of each such triggering, oscillator 53 delivers a pulse of, say, positive sense which is of considerably less length than the minimum half-wavelength of signal 51. These pulses, the repetition frequency of which is clearly controlled by the output of phase discriminator 24, serve as the output pulses of generator 21 delivered over channel A to discriminator 29 and will accordingly be referred to as the A pulses. They are also applied to the combined pulse-counter and square-wave generator 22, as already indicated. Signal 51 is also applied as one of the inputs to a two-entry AND gate 54 the output of which is applied to inhibit the action of multivibrator 51 in the manner to be described.

Generator 25 similarly includes a multivibrator 61 controlled over a lead 62 from phase discriminator 27 and itself controlling by each negative-going edge of its output signal—signal 61—a blocking oscillator 63 which supplies positive pulses B to channel B and to the combined counter and square-wave generator 26.

The pulses A and B are also applied as the second inputs to gates 64 and 54 respectively.

The arrangement is such that as regards generator 21, gate 54 delivers an inhibiting signal to vibrator 51 whenever a pulse B occurs during a positive half-cycle of signal 51. The inhibiting action is such as to maintain cut off whichever of the two transistors of vibrator 51 is unenergised during this half-cycle and so hold back the ensuing negative-going edge of signal 51 until the B pulse has ended. This prevents the generation by oscillator 53 of the next pulse A during the existence of a pulse B.

It will be appreciated that a pulse B does not effectively delay the next pulse A unless that pulse B occurs near the end of a positive half-cycle of signal 51.

In other words, a pulse A cannot be generated during a pulse B, since for the generation of a pulse A, signal 51 must pass from a positive half-cycle to a negative one and that transition is inhibited by pulse B acting through gate 54.

When on the other hand a pulse B occurs during a negative half-cycle of signal 51, gate 54 passes no inhibiting signal; and no such signal is required, since as each pulse B is much shorter than a half-cycle wavelength of signal 51, that pulse B must necessarily end before the generation of the next pulse A at the end of the ensuing positive half-cycle of signal 51. In other words, there is more than a half-cycle of signal 51 between that pulse B and the next pulse A, and as pulse B is shorter than any such half-cycle the pulse B must have ended before the pulse A is generated.

Similarly the occurrence of a pulse A during the occurrence of a positive half-cycle of signal 61 delays the generation of the next pulse B until that pulse A is ended.

Thus the pulses A and B supplied by generators 21 and 25 can neither coincide with one another nor be lost.

Pulse sequence discriminator 31 of difference discriminator 29 includes a bi-stable device 71 (see FIG. 4) arranged to be controlled by the pulses in channels A and B so as to be switched to one of its stable states (if not already in that state) by each pulse A and switched to its other stable state (if not already in that other state) by each pulse B. These stable states will be referred to as state A and state B respectively.

Device 71 provides two ouputs of rectangular waveform in counterphase. The output which goes positive when the device is switched to state A is applied through a delay line 72 as one of the inputs of a two-entry AND gate 73, the other input to which is derived from channel A direct. The output of the gate is connected to channel C. The delay imposed by delay line 72 is somewhat longer than the length of an A pulse but is shorter than the minimum spacing between the A pulses, by which is meant the spacing between the A pulses at their fastest rate of generation. This spacing is of course the minimum wavelength of signal 51, from which, as already explained, the A pulses originate.

The other output from device 71 is similarly applied through a delay line 74 as one of the inputs to an AND gate 75 the other input of which is derived from channel B direct. The output of the gate is connected to channel D.

Gate 73 is arranged to pass to channel C a pulse arriving direct from channel A when and only when the condition at the other input to the gate corresponds to state A of device 71. Gat 75 is similarly arranged to pass to channel D a pulse arriving direct from channel B when and only when the condition at the other input to the gate corresponds to state B of device 71.

In describing the operation of pulse sequence discriminator 31 it will be assumed to begin with that the pulses are arriving over channels A and B alternately. On the arrival of a pulse A, then, device 71 is in its state B, to which it was switched by the preceding pulse, which was a pulse B. This pulse A accordingly switches device 71 to its state A and at the same time arrives at gate 73 over the direct connection from channel A. Owing to the delay imposed by delay line 72 the other input to the gate is not as yet in the state A condition, and does not reach that condition until the originating pulse A has ended. In consequence no pulse is passed by gate 73 to channel C.

If the next pulse is a pulse B, no pulse is passed by gate 75 to channel D for a similar reason—namely, that delay line 74 prevents one of the inputs to the gate from reaching the state B condition until the originating B pulse has ended.

If on the other hand the pulse which follows the first-mentioned A pulse is another A pulse, device 71 is already in state A, to which it was switched by the preceding A pulse, and delay line 72 has had time to pass this condition as one of the inputs to gate 73. Accordingly this second A pulse on arriving at the gate over the direct connection is passed by the gate to channel C.

Similarly if two B pulses arrive in succession; the second pulse is passed by gate 75 to channel D.

In stage 32 the two trains of C and D pulses are combined in opposite senses. To effect this the stage includes an amplifier 81 arranged to amplify the C pulses without changing their sense and an amplifier 82 arranged to amplify the D pulses in reverse sense. The outputs of the amplifier are combined by some convenient resistance network, depending on the nature of the amplifier circuits and represented generally at 83, to provide over output channel 30 the required train of pulses some of positive sense and some of negative sense to effect the required machine control.

What we claim is:

1. Signal-translating apparatus for converting electrical signals from phase-modulated sinusoidal form to pulse form, the phase-modulated signals being represented by the phase displacement between a control sinusoidal signal and a reference sinusoidal signal and the output pulses being some of positive sense and some of negative sense dependent on the sense of such displacement including first and second generators of electrical pulses of constant sense but controllable repetition frequency, means to which the reference signal is applied for so controlling the first generator that the number of pulses generated by it during each half cycle of said reference signal has a constant value $N/2$, means to which the control signal is applied for so controlling the second generator that the number of pulses generated by it during each half cycle of said control signal has said constant value $N/2$, and a difference discriminator to which the pulse outputs of the generators are applied for producing an output train of pulses having a repetition frequency equal to the difference between the repetition frequency of the pulses of one generator and the repetition frequency of the pulses of the other generator, the sense of the pulses in said output train being dependent on which of the generator frequencies is the greater.

2. Signal-translating apparatus as claimed in claim 1 wherein said means for controlling the first generator includes a combined pulse counter and square-wave generator stage comprising a counter, connections for applying to said counter the pulses generated by the first generator, a bi-stable device for producing output signals of two different fixed voltage levels and means for switching said bi-stable device from one to the other of its stable states after receipt by said counter by every said $N/2$ constant number of pulses, a phase discriminator for comparing the output signal from said stage with said reference signal, and connections for applying the output from the discriminator to said first generator to control the pulse repetition frequency thereof so as to maintain said output signal and said reference signal in a fixed phase relationship.

3. Signal-translating apparatus as claimed in claim 1 wherein said means for controlling the second generator includes a combined pulse counter and square-wave generator stage comprising a counter, connections for applying to said counter the pulses generated by the second generator, a bi-stable device for producing output signals of two different fixed voltage levels and means for switching said bi-stable device from one to the other of its stable states after receipt by said counter of every said $N/2$ constant number of pulses, a phase discriminator for comparing the output signal from said stage with said control signal, and connections for applying the output from the discriminator to said second generator to control the pulse repetition frequency thereof so as to maintain said output signal and said control signal in a fixed phase relationship.

4. Signal-translating apparatus as claimed in claim 1 including inhibiting means for each of said generators, and connections for applying each pulse generated by each of said generators to the inhibiting means of the other generator, each inhibitng means being arranged to inhibit the operation of the associated generator during the existence of a pulse of the other generator.

5. Signal-translating apparatus as claimed in claim 1 wherein said difference discriminator includes a bi-stable device having first and second stable states, connections for applying the pulses of the first generator to switch the device to its first stable state, connections for applying the pulses of the second generator to switch the device to its second stable state, a first and a second delay stage for said first and said second generator, respectively, each stage having a delay longer than a said pulse but shorter than the minimum spacing between pulses, connections for applying the output of said device to each of said delay stages, a first and a second two-entry gating stage for said first and said second generator, respectively, connections for applying as the inputs to the first gating stage the pulses of the first generator and the output of the first delay stage, said first gating stage being arranged to pass a pulse to a first channel when and only when a pulse of the first generator reaches the gating stage when the condition at the other input of the stage corresponds to the first stable state of said device as delayed by said first delay stage, and connections for applying as the inputs to the second gating stage the pulses of the second generator and the output of the second delay stage, said second gating stage being arranged to pass a pulse to a second channel when and only when a pulse of the second generator reaches the gating stage when the condition at the other input of the stage corresponds to the second stable state of said device, as delayed by said second delay stage.

References Cited in the file of this patent

UNITED STATES PATENTS

| | | |
|---|---|---|
| 2,086,918 | Luck | July 13, 1937 |
| 2,574,494 | Palmer | Nov. 13, 1951 |
| 2,877,416 | Grisdale | Mar. 10, 1959 |
| 2,913,664 | An Wang | Nov. 17, 1959 |
| 2,918,625 | Houghton et al. | Dec. 22, 1959 |
| 2,921,190 | Fowler | Jan. 12, 1960 |
| 2,933,682 | Moulton et al. | Apr. 19, 1960 |